Feb. 26, 1957 A. RUSCH 2,782,833
APPARATUS FOR MAKING NON-WOVEN TUBULAR FABRIC
Filed Jan. 3, 1955 2 Sheets-Sheet 1
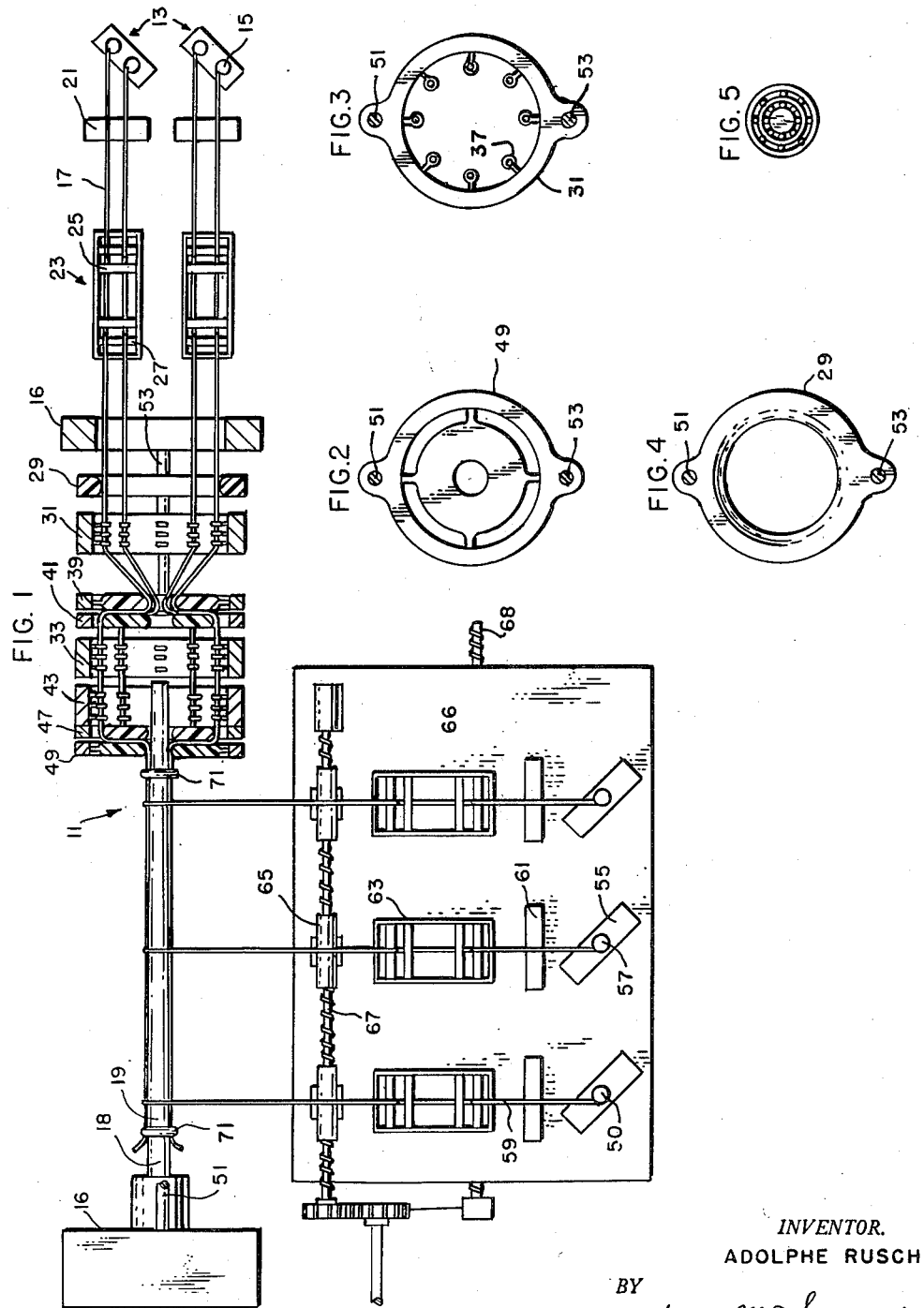
INVENTOR.
ADOLPHE RUSCH
BY
Harry M. Saragovitz
ATTORNEY Feb. 26, 1957 A. RUSCH 2,782,833
APPARATUS FOR MAKING NON-WOVEN TUBULAR FABRIC
Filed Jan. 3, 1955 2 Sheets-Sheet 2

INVENTOR.
ADOLPHE RUSCH
BY
Harry M. Saragovitz
ATTORNEY

United States Patent Office 2,782,833
Patented Feb. 26, 1957

2,782,833

APPARATUS FOR MAKING NON-WOVEN TUBULAR FABRIC

Adolphe Rusch, Rumson, N. J., assignor to the United States of America as represented by the Secretary of the Army Application January 3, 1955, Serial No. 479,687

2 Claims. (Cl. 154—1.7)

(Granted under Title 35, U. S. Code (1952), sec. 266)

The invention described herein may be manufactured and used by or for the Government for governmental purposes, without the payment of any royalty thereon.

This invention relates to an improved process and apparatus for making non-woven tubular forms, shapes, and articles of manufacture.

In my copending application Serial No. 396,086, filed December 3, 1953, for "Method of Making Non-Woven Cloth, Laminates and the Like," and issued as U. S. Patent No. 2,731,376 on January 17, 1956, there is set forth a process for manufacturing woven cloth, laminated articles and the like wherein the laminated article is made by spinning a form and feeding a thread or threads about the form in several different axial positions thereby applying warp and filler threads to complete the finished article. However, such a device is limited to the manufacture of flat sheet-like laminated articles, or rectangular parallelepiped forms such as box-like battery containers and the like.

The present invention, in view of the limitations of the earlier filed application, has as its primary object to provide an apparatus for and method of making non-woven tubular bodies. In general, the tubular bodies made by the process described herein consist of layers of plies of unwoven warp and filler threads. The finished body may be made to contain any number of picks or ends per inch. Threads of different types can readily be incorporated into any desired body to provide properties such as great strength, fine or coarse finish, etc. In the process of making any body, the threads may be bonded together by resin or any other type of adhesive, according to the material used and particular properties desired in any finished body.

It is an object of the invention to make non-woven tubular bodies by a method which is simpler and less expensive than methods in use heretofore.

It is a further object of the invention to make non-woven tubular bodies in which the number of ends and picks per inch may be accurately controlled.

A further object of the invention is to provide a method of making laminated tubular bodies which have extremely high impact resistance and are light in weight.

In general, the non-woven laminated tubular body is made in accordance with this invention, first, by applying warp threads to a tubular form such as a mandrel of the desired dimensions, by drawing the threads over said form by means of a movable heddle, and repeating such application of warp threads until any desired number of warp laminates are applied to the surface of the tubular form; and secondly, by applying the filler threads over the formed warp by means which include a movable support guide for the filler yarn, which guide is slidably movable by any appropriate means. The threads are bonded together in the conventional manner by resin or any other type of adhesive, according to the material used and the properties desired in the finished body. While the method and the finished body in the particular example herein will be described as being fabricated of glass thread, it is to be understood that the method is applicable to any type of thread, including glass, cotton, rayon, nylon, plastic metal, silk, etc., and the thread may be either flat or round, roving or yarn.

The invention, both as to the device used and the method of operation, can best be understood by reference to the following description taken in conjunction with the accompanying drawings in which:

Figure 1 is a plan view, partly in section, of an apparatus for making a tubular laminated body in accordance with the present invention;

Figure 2 is a plan view of the fraction holding clamps employed in Figure 1;

Figure 3 is a plan view of a heddle and its supporting frame;

Figure 4 is a plan view of the condenser;

Figure 5 is a sectional view of the finished body, and

Figure 6:
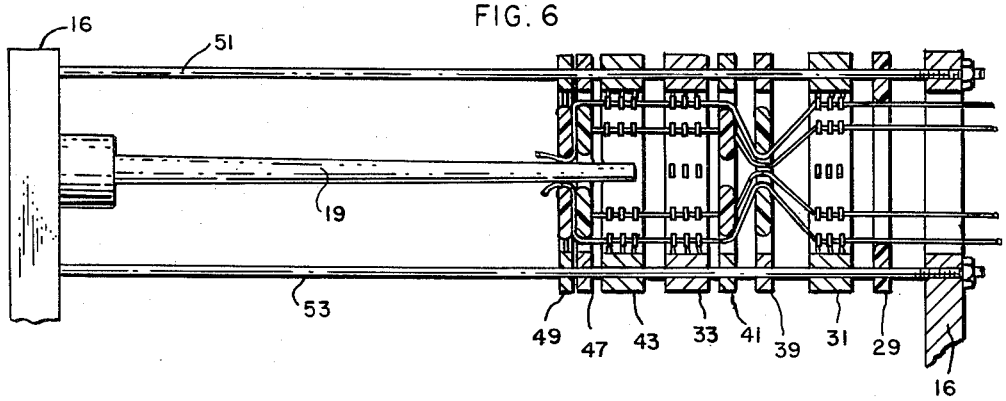
Figures 6 and 7 are explanatory diagrams, partly in section, to illustrate in part the operation of the device.

In order to better understand the general inventive concept disclosed herein, the invention will be explained in the terms of the manufacture of one specific item; i. e., an antenna mast made of glass roving or glass thread. However, it is to be understood that the invention is limited neither to the manufacture of the specific antenna nor to the antenna itself.

Referring to the drawing, in Figure 1 there is shown a preferred form of the apparatus designated generally as 11 and comprising in part creels 13 which serve as a supporting means for spools 15 upon which the glass threads 17 are wound. While not shown in toto herein, as forming no part of the invention, some form of frame or carriage such as shown at 16 should be provided to serve as a supporting means for the apparatus 11.

Mounted on the support 16 is the apparatus for feeding warp threads 17 onto the mandrel 19 which may be of any desired tubular dimensions. The spools 15 feed the thread 17 through an aperture in warp guide member 21, into and through a bath 23 containing polyester resin or other suitable adhesive. For purposes of clarity only two such baths are shown. Glass rods 25 within bath 23 serve to keep and maintain the thread 17 immersed in the resin and glass rod 27 therein serves to wipe any excess resin from the thread as it passes out of the bath 23. It is to be noted from an observation of Figure 1 that one of the creels 13 supplies sufficient threads to make up one-half of the warp comprising the finished tubular product in the manner hereinafter described, while the other creel supplies sufficient threads for the other half of the warp portion.

Spaced from the bath 23 is a fixed conventional condenser 29 mounted axially with repect to mandrel 19, and which acts to separate the threads 17 so that they may be more readily adaptable for fabrication into the desired tubular product. In axial alignment with condenser 29 and positioned to the left of said condenser, as viewed in Figure 1, there are provided respectively, a first heddle 31, a first pair of slidable friction clamping members 39 and 41, a second heddle 33, a third heddle 43, and a second pair of slidable friction clamping members 47 and 49. All the members indicated above are supported by means of two spaced rods 51 and 53 positioned between the supports 16. Each heddle is identical and comprises a plurality of eyelet-like guides 37, which are generally used to guide the warp threads to the mandrel. First heddle 31, clamping member 39, and second heddle 33 are supported by the rods 51 and 53. Clamping member 41 is adapted to be movable along with member 39 so as to engage and lock the threads at any one given step in the operation hereinafter described. The detailed structure of the clamp members is illustrated in Figure 2. Each member comprises a disc provided with a central opening and a frame which includes means for supporting the disc centrally within the frame. By such an arrangement, annular slots are provided in addition to the central opening. When in locked position both clamping members are in abutting relationship. Third heddle 43 and clamping members 47 and 49 are slidably mounted on rods 51 and 53 and adapted to move axially along the surface of mandrel 19.

The components described above are used for the application of the warp threads in the manufacture of the tubular laminated product. For applying the filler thread, means substantially identical to those set forth in copending application Serial No. 396,086 are utilized. As shown in Figure 1, such means comprise a plurality of creels 55 on which spools 57 are mounted for feeding filler threads 59 onto the mandrel 19. The threads from each spool pass through respective guide members 61, through a bath 63, and through a guide frame 65 which is longitudinally actuated by a worm drive 67. The creels 55 and the baths 63 are mounted on a movable framework 66 movable longitudinally along a shaft 68 which is driven in synchronism with the worm drive 67 by any suitable means. Thus it is obvious that as the worm drive 67 rotates, filler threads will be circumferentially wound on the mandrel surface as it is rotated in one direction. While not shown, appropriate limit stop means are provided, along with reversing means such as a reversible motor, to enable the framework 66 to move back and forth along the worm 67. Appropriate stops can be utilized to limit the movement of travel of any one of the guide frames 65 so that one or more filler threads may be used depending upon the length of the finished tubular product.

Figure 7:
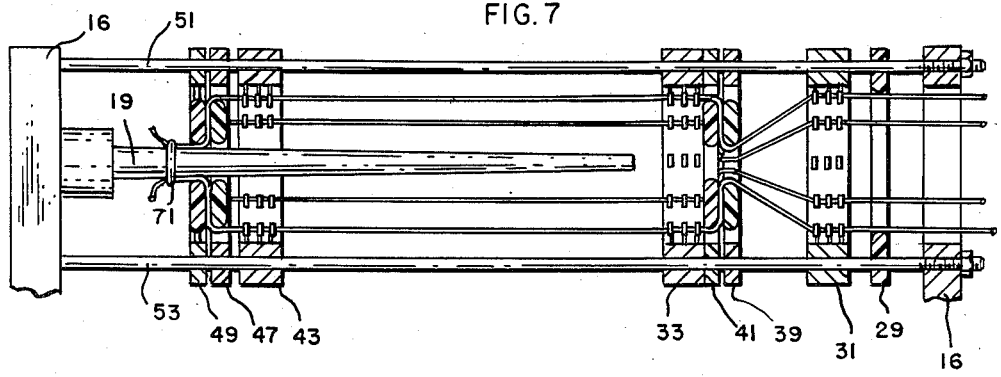

For a detailed description of the operation of the device in the fabrication of a tubular product, reference is made to Figures 6 and 7 which show in detail the operating steps in applying the warp threads in the following manner: Glass threads 17 are fed from the spools 15 on creel 13 through the guide member 21 and resin bath 23 through condenser 29, through the first heddle 31, and converge as they pass through the center opening of the first clamping member 39. The threads are then fed through the annular slot of the second clamping member 41, through the second and third heddles 33 and 43, and through the second pair of clamping members 47 and 49. In operation, friction clamping members 31 and 41 are initially in open position, that is, spaced slightly apart to allow the threads to pass freely therethrough. Simultaneously, friction clamping members 47 and 49 are in abutment with each other. By this arrangement it is obvious that threads between the clamping members 47 and 49 will be securely held and no free movement of the thread between said members will take place. While there have not been shown herein any means for clamping together the members 47 and 49, it is obvious that any clamping means, such as a clamping spring, may be utilized to maintain such members in abutting position. As mentioned hereinabove, the last two clamping members 47 and 49 and heddle 43 are then axially moved along the surface of the mandrel 19 thereby pulling the threads from right to left as exemplified in Figure 7 of the drawings. The heddle 43 is moved along in unison with the clamping members 47 and 49 in order to keep the threads evenly spaced about the mandrel. When the clamped members 47 and 49 reach their extreme limit stop at the left-hand side of the mandrel 19 as shown in Figure 7, clamping members 39 and 41 are then placed in abutment relationship to firmly engage the threads at the right-hand side of the frame as shown in Figure 7, thus drawing taut the threads about the mandrel. A clamping ring 71, such as a strong elastic band of rubber or of metal, can then encircle the threads at the end of the tubular product to maintain such threads tautly and tightly about the mandrel for each extreme position of movable heddle 43. Friction clamping members 47 and 49 are then opened, and together with heddle 43 are returned to the position shown in Figure 6, and when they reach their limit of movement at the right-hand side of the apparatus, the clamping members 47 and 49 are then again firmly locked in abutment relationship thus enabling the threads to be drawn taut upon the mandrel. Another clamping member similar to that shown at 71 is applied to the right-hand side thus enabling the threads so far applied to be firmly held in position. At such time the threads are cut at the right-hand side and the operation can then be repeated any number of times so that any number of layers of warp threads can be applied in identical fashion. It is to be understood that clamping rings 71 may be a split hinged ring so that it may be opened and closed at the appropriate times. For example, with heddle 43 at the extreme left shown in Figure 7, the left clamping ring is closed while the right clamping ring may now be opened as the heddle reverses its position and passes from left to right. At the extreme right position of heddle 43, the right clamping ring will now be closed and the left clamping ring opened.

After the desired number of warp threads have been applied to the mandrel, the filler threads are applied in the manner described briefly above duplicating the manner of application of threads as described in copending application Serial No. 396,086. To reiterate, the filler threads are applied from the creels 55 through the guide members 61 through the bath 63 and on to the mandrel 19 over the warp threads heretofore applied. Any number of layers of filler threads may likewise be applied. It is obvious that no definite order of warp and filler threads is intended as a fixed mode of operation of the present invention as alternate single layers of filler and warp threads may be applied or any successive number of filler threads and warp threads can be applied in any desired number.

After the desired number of filler and warp threads have been applied, the completed body is removed from the mandrel 19. To facilitate the separation of the tubular body from the mandrel form, the exterior of the mandrel is normally coated with a lubricating substance, such as silicone grease, prior to the winding of the threads thereon. After the desired number of plies or laminates have been fabricated, the resultant tubular structure is cured in the following manner. For example, when using a polyester resin such as a Laminac or a Paraplex resin the laminate may be heated for about three quarters of an hour at 210 degrees Fahrenheit. In the method described, resin is applied to the thread prior to the feeding of the threads on to the form; however, it is to be understood that the resin may be applied after the thread is on the form. The method described has the advantage that all the threads are certain to be coated and the finished product is therefor certain to be of a uniform thread. While a resin bath has been shown for applying the resin, a resin spray, a roll or a drum immersed in resin or any other known method in the art for applying the resin to the thread may be used. In the operation of the apparatus herein reference has been made to the movement of the various friction clamping members and the several heddles. While for simplicity of description it is to be assumed that the movement of such components can be manually operable, it is obvious that automatic mechanically or electrically operated devices can be utilized to accomplish all such movements with appropriate braking and stop-start controls to effectuate any desired results.

While there have been described what are at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. An apparatus for making non-woven tubular bodies comprising a feed source for supplying warp threads to said body, a condenser spaced from said fixed feed source, a first fixed heddle and a second fixed heddle, a first pair of slidable friction clamping members in operable association with said second heddle, a third movable heddle, and a second pair of slidable friction clamping members in operable association with said third heddle, said warp threads passing through said first, second, and third heddles and terminating at said second pair of friction clamping members, a mandrel in axial alignment with said heddles and said friction clamping members whereby when said third movable heddle and said second clamping means are drawn over said mandrel, said warp threads are longitudinally deposited over said mandrel, and means for applying filler threads upon said mandrel.

2. A device of the type set forth in claim 1 and further provided with means for applying an adhesive to said threads.

References Cited in the file of this patent

UNITED STATES PATENTS

| | | |
|---|---|---|
| 2,366,853 | Greene | Jan. 9, 1945 |
| 2,422,234 | Goldman | June 17, 1947 |
| 2,594,693 | Smith | Apr. 29, 1952 |
| 2,680,469 | Ahier et al. | June 8, 1954 |
| 2,694,661 | Meyer | Nov. 16, 1954 |
| 2,696,244 | Jackson | Dec. 7, 1954 |